INVENTORS.
DONALD G. NEVILLE.
DAVID PLATNICK.
BY Frederick E. McMullen
ATTORNEY.

INVENTORS.
DONALD G. NEVILLE.
DAVID PLATNICK.

ATTORNEY.

United States Patent Office 3,381,192
Patented Apr. 30, 1968

1

3,381,192
MOTOR CONTROL CIRCUITRY RESPONSIVE TO A ROTOR POSITION SENSING ARRANGEMENT
Donald G. Neville and David Platnick, Syracuse, N.Y., assignors to Carrier Corporation, Syracuse, N.Y., a corporation of Delaware
Filed June 7, 1965, Ser. No. 461,809
6 Claims. (Cl. 318—138)

ABSTRACT OF THE DISCLOSURE

A commutatorless electric motor having a plurality of motor windings connected in series with a plurality of silicon controlled rectifiers to a source of DC current for selective energization of the motor windings upon triggering of the silicon controlled rectifiers to a conducting state. A control circuit for triggering the silicon controlled rectifiers is provided which includes a plurality of reactance elements in a like plurality of legs of a bridge circuit. The reactance elements are disposed in proximity with a rotating metal member which affects their magnitude and causes balancing or unbalancing of the bridge circuit depending upon the proximity of the metal rotor member. An alternating voltage is supplied to the input of the bridge and the output of the bridge is connected to the gate terminals of the silicon controlled rectifiers to sequentially energize the motor windings in a predetermined pattern.

---

This invention relates to dynamoelectric machines and, more particularly, to a motor adapted for operation on direct current.

In dynamoelectric machines such as direct current motors in which the conventional brush and commutator system has been replaced by a stationary commutating arrangement employing solid state switching devices, such as silicon controlled rectifiers, it is essential that some arrangement for indicating the movement of the rotating parts of the machine relative to the stationary parts be provided upon which controlled firing of the several switching devices may be based. Some movement sensing arrangements with which applicants are familiar are excessively complex, and many of the type relying on relative movement between a coil and a magnet to produce a controlling signal indicative of the movement to be measured are incapable of starting the machine from a standstill. This latter type of movement sensing arrangement inherently has very poor low speed response and usually requires that a second sensor such as a brush and commutator be provided if self-starting and low speed operation of the machine are to be realized.

It is a principal object of the present invention to provide a new and improved operating arrangement for dynamoelectric machines.

It is a further object of the present invention to provide an improved mechanism for sensing the relative position of and movement between two members.

It is a further object of the present invention to provide a unique position sensing arrangement which incorporates electrical bridge circuits adapted to change from a balanced to an unbalanced condition in response to changes in the relative position of two parts.

It is an object of the present invention to provide a mechanism for sensing the relative positions of two parts which produces a high output signal regardless of the relative velocity between the two parts.

It is an object of the present invention to provide a position sensing mechanism for use with dynamoelectric machines which enables the machine to be self-starting and which provides unexcelled response through all speed ranges of the machine.

2

This invention relates to an apparatus for sensing changes in position of a first part relative to a second part comprising in combination means forming an electrical network having a pair of substantially balancing impedance elements, the network including paired input and output terminals; a source of alternating current voltage impressed upon the network input terminals; and means for varying the impedance of one of the network impedance elements in response to a change in position of the first part relative to the second part to unbalance the network and establish a signal voltage at the output terminals.

Figure 1:
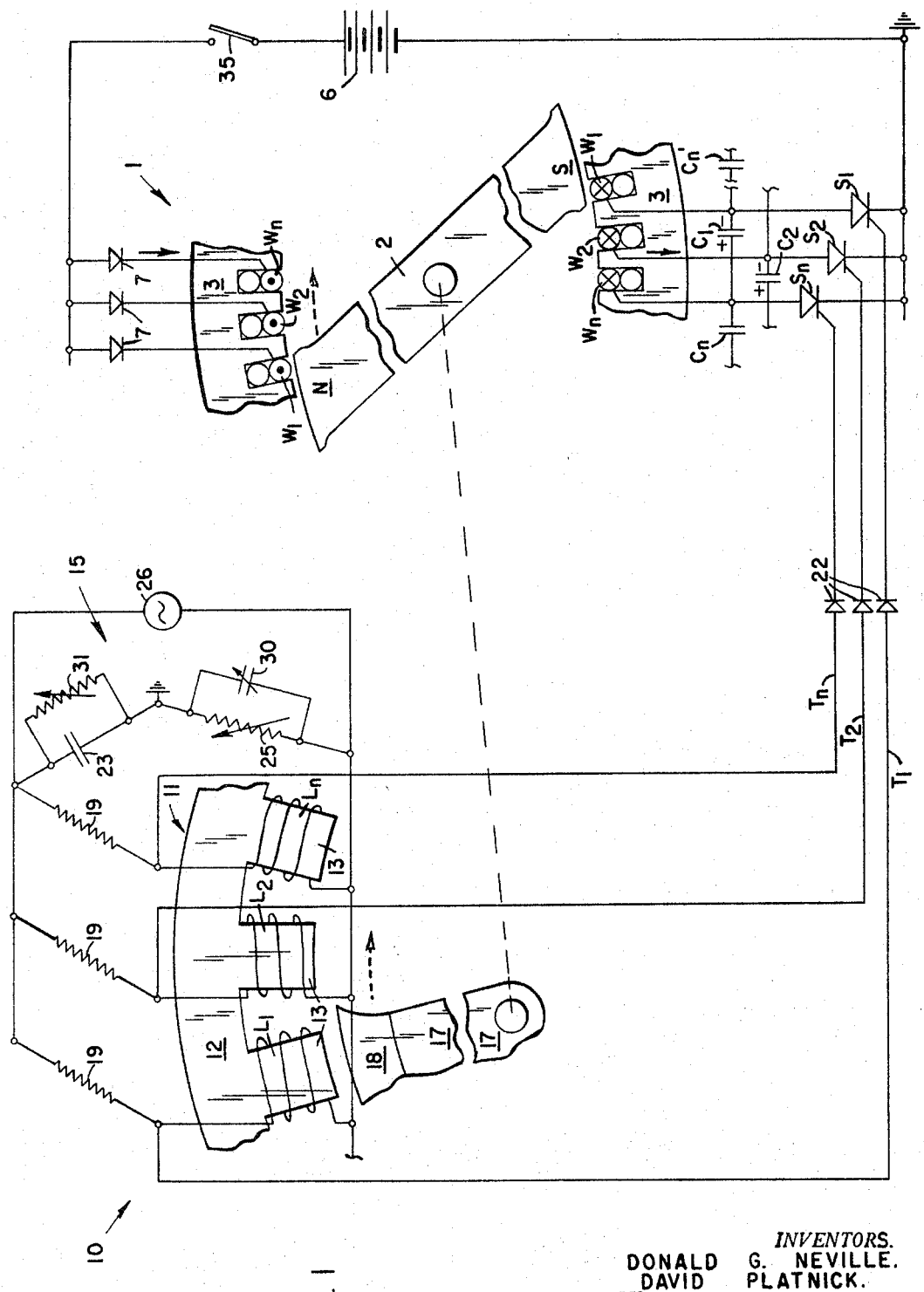
Figure 2:
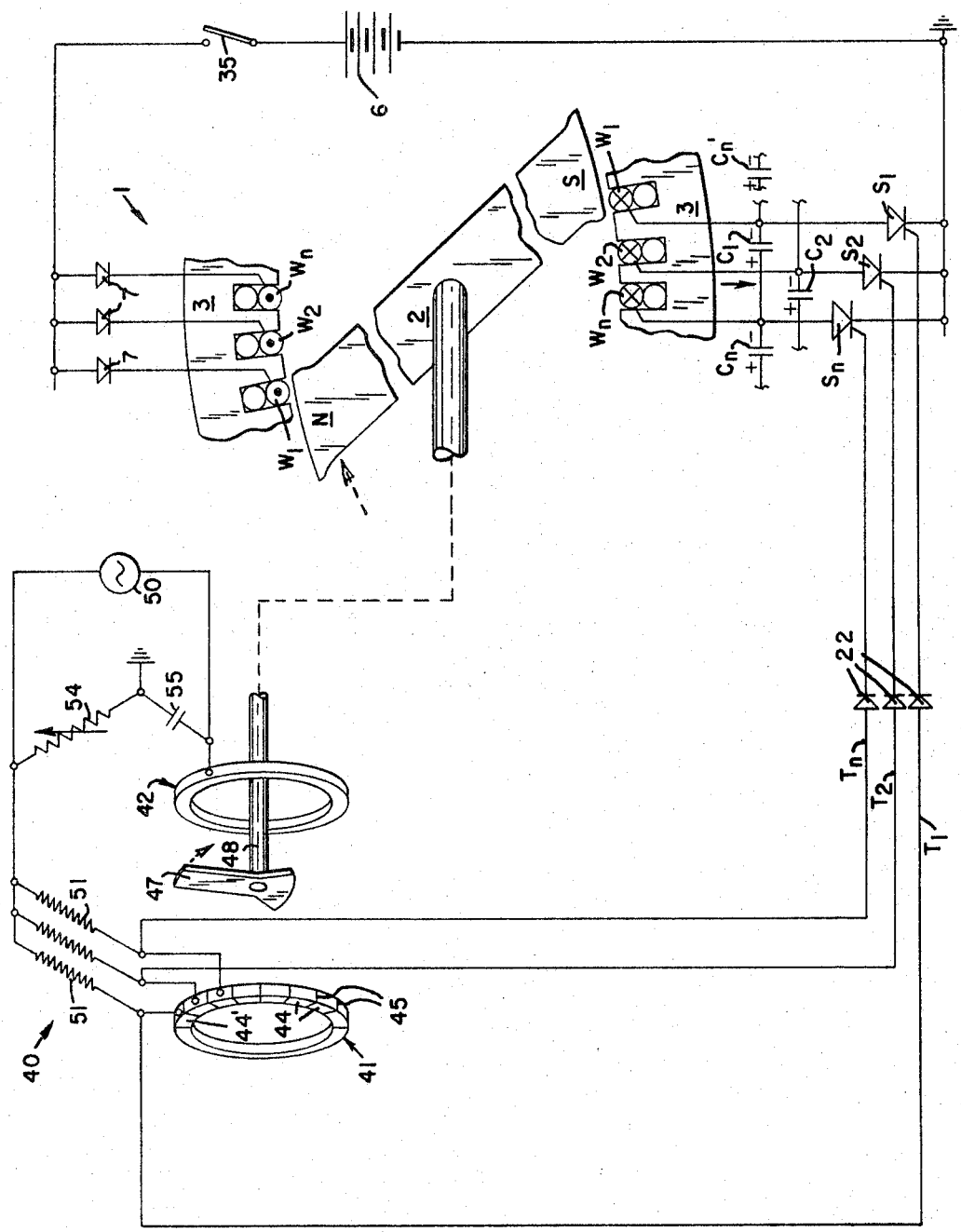

The attached drawings illustrate a preferred embodiment of the invention in which:

FIGURE 1 is a circuit diagram showing the motor operating arrangement according to this invention; and FIGURE 2 is a circuit diagram showing a modified form of the motor operating arrangement according to this invention.

Referring to the drawings, there is shown a motor 1 having a relatively rotatable rotor 2 and stator 3 inductively coupled one to the other. Preferably, rotor 2 comprises a permanently magnetized member having northsouth poles. Stator 3 is provided with a plurality of windings $W_1$, $W_2$, $W_n$ effective when energized to establish magnetic poles, the resulting energy transfer generating a torque between the relatively rotatable rotor 2 and stator 3.

A source of direct current energy, for example battery 6, is provided. Switching devices $S_1$, $S_2$, $S_n$ are series connected with windings $W_1$, $W_2$, $W_n$, respectively, across the positive and negative sides of battery 6. Preferably, diodes 7 are series connected with each of the switching devices $S_1$, $S_2$, $S_n$. Diodes 7 prevent reverse flow of current from windings $W_1$, $W_2$, $W_n$ upon deenergization thereof. Capacitors $C_1$, $C_2$, $C_n$ are provided in the input electrode circuits of switching devices $S_1$, $S_2$, $S_n$ to effect deenergization of associated windings $W_1$, $W_2$, $W_n$ at appropriate times, as described below.

Switching devices $S_1$, $S_2$, $S_n$ are preferably solid state or semi-conductor type switching devices and preferably silicon-controlled rectifiers. Other suitable switching devices such as thyratrons may be contemplated. Switching devices $S_1$, $S_2$, $S_n$, when rendered operative, complete a circuit from the positive terminal of battery 6 through windings $W_1$, $W_2$, $W_n$, respectively, to the negative terminal of battery 6. Current flow through windings $W_1$, $W_2$, $W_n$ is in the direction indicated by the solid line arrow in the drawing.

Capacitors $C_1$, $C_2$, $C_n$ are illustrated in the exemplary embodiment as interconnected between the input electrodes of every other switching device whereby two independent control capacitor circuits are formed. That is, capacitor $C_1$ is interconnected between the input electrodes of switching devices $S_1$, $S_n$. Capacitor $C_2$ is interconnected between the input electrodes of switching device $S_2$ and the switching device (not shown) for the winding next adjacent $W_n$. Capacitors $C_1$, $C_n$, $C_n'$ comprise one capacitor circuit, the capacitor $C_n'$ being interconnected between the input electrodes of the switching device (not shown) for the next to the last winding and $S_1$. Capacitor $C_2$ is part of the second capacitor circuit.

While capacitors $C_1$, $C_2$, $C_n$ are illustrated as interconnecting the input electrodes of every second switching device, it is understood that capacitors $C_1$, $C_2$, $C_n$ may be interconnected between the input electrode of each switching device whereby one control capacitor circuit is formed, or between every third, or fourth, etc., switching device input electrodes to form three, or four, etc., control capacitor circuits.

Operation of switching devices $S_1$, $S_2$, $S_n$ is controlled in response to the position of motor rotor 2 by a control mechanism 10. Control mechanism 10 is comprised of a rotor position sensor 11 and bridge circuit means 15. Position sensor 11 is comprised of a stationary ring-like member 12 having a plurality of inwardly directed, circumferentially spaced spikes or protrusions 13 therearound. A movable member 17, arranged for concurrent rotation with motor rotor 2, is disposed within the stationary member 12. A part 18 is suitably secured to the periphery of member 17. Part 18 is comprised of a ferromagnetic material. If desired, part 18 may be integral with movable member 17. In that circumstance, member 17 may be formed from a ferro-magnetic material.

Coils $L_1$, $L_2$, $L_n$ are suitably disposed on each of the protrusions 13 of position sensor member 12. Adjacent coils $L_1$, $L_2$; $L_2$, $L_n$, are preferably wound oppositely to enhance mutual inductance therebetween.

A resistor 19 connects one side of each coil $L_1$, $L_2$, $L_n$ to one terminal of a suitable alternating current source such as oscillator 26. Lines $T_1$, $T_2$, $T_n$ connect the junction of resistors 19 with their respective coils $L_1$, $L_2$, $L_n$ to the control electrodes of switching devices $S_1$, $S_2$, $S_n$ respectively. Each coil $L_1$, $L_2$, $L_n$ with its associated resistor, forms one side of an electrical bridge circuit. The opposite side of coils $L_1$, $L_2$, $L_n$ are connected to the other terminal of oscillator 26. A suitable impedance such as a capacitor 23 and variable resistor 25 make up the other side of the electrical bridge circuit and are connected across oscillator 26. The junction of capacitor 23 with resistor 25 is connected to the output electrode of switching devices $S_1$, $S_2$, $S_n$. Since the output electrodes of switching devices $S_1$, $S_2$, $S_n$ are at ground potential, the junction of capacitor 23 with resistor 25 may be grounded.

As may be understood, each of coils $L_1$, $L_2$, $L_n$ with its associated resistor 19, form, in cooperation with capacitor 23 and resistor 25, a plurality of individual electrical bridge circuits. Coils $L_1$, $L_2$, $L_n$, resistors 19, resistor 25, and capacitor 23 are chosen so that opposite sides of the several bridge circuits have substantially equal voltages. As will be more apparent hereinafter, movement of ferro-magnetic part 18 of member 17 proximate one of coils $L_1$, $L_2$, $L_n$ changes the inductance of that coil thereby unbalancing the bridge circuit associated therewith.

Resistors 19 are preferably substantially equal. The inductance of coils $L_1$, $L_2$, $L_n$ is preferably substantially equal. The several bridge circuits may be comprised of other types of impedances. For example, resistors 19, 25 and capacitor 23 may be replaced by suitably sized coils. Alternately, resistors 19, 25 may each be replaced by a suitably sized capacitor and coil, respectively.

Preferably, variable capacitor 30 and variable resistor 31 are provided in parallel with resistor 25 and capacitor 23. Capacitor 30 and resistor 31 permit close adjustment of the bridge circuit impedance.

Diodes 22 are provided in each of lines $T_1$, $T_2$, $T_n$. Diodes 22 prevent flow of any unbalancing reverse currents through lines $T_1$, $T_2$, $T_n$ into the bridge circuit means 15 which might occur during operation of the switching devices $S_1$, $S_2$, $S_n$.

Referring to FIGURE 1 of the drawings, with switch 35 closed and ferro-magnetic part 18 of movable member 17 in the position shown, part 18 changes the inductance of coil $L_1$. The bridge circuit comprised of coil $L_1$, resistor 19, capacitor 23 and resistor 25 is unbalanced and a signal voltage is applied through line $T_1$ to the control electrode of switching device $S_1$ to render that switching device operative. Operation of switching device $S_1$ completes a circuit from the positive terminal of battery 6 through switching device $S_1$ to the negative terminal of battery 6 to energize the winding $W_1$. Current flow in winding $W_1$ is in the direction shown by the solid line arrow. Capacitor $C_1$ is charged as shown in the drawing.

As rotor 2 of motor 1, and member 17 rotate in a clockwise direction, as shown by the dotted line arrow, ferro-magnetic part 18 of member 17 comes adjacent coil $L_2$. The disposition of the ferro-magnetic part of member 17 adjacent coil $L_2$ changes the inductance of coil $L_2$ and unbalances the bridge circuit comprised of coil $L_2$, resistor 19, capacitor 23 and resistor 25. The resulting signal voltage in line $T_2$ renders switching device $S_2$ operative.

Operation of switching device $S_2$ completes a circuit from battery 6 through switching device $S_2$ to energize winding $W_2$. Capacitor $C_2$ is charged in the manner shown in the drawing.

The continued movement of motor rotor 2 brings part 18 of movable element 17 adjacent coil $L_n$ to unbalance the bridge circuit comprised of coil $L_n$, resistor 19, capacitor 23 and resistor 25 and place a signal voltage, via line $T_n$, on the input electrode of switching device $S_n$ to render $S_n$ operative and energize winding $W_n$. Switching device $S_n$ connects capacitor $C_1$ across switching device $S_1$. The discharge of capacitor $C_1$ reduces current flow through switching device $S_1$ to render switching device $S_1$ inoperative.

The continued clockwise rotation of motor rotor 2 sequentially brings part 18 of element 17 into proximity with each of the coils on stationary member 12 to unbalance the individual bridge circuits associated therewith and render the switching devices associated with each winding operative to energize the windings. Each switching device, when operated, connects a control capacitor across the switching device of an energized winding to discharge the capacitor and render that switching device inoperative thereby deenergizing the winding associated therewith.

The number of windings $W_n$ energized at any given time may be varied by varying the arcuate extent of the ferro-magnetic portion 18 of movable member 17. While applicants' control mechanism has been described as utilizing the change in each bridge circuit from a balanced to an unbalanced condition, caused by movement of a ferro-magnetic part 18 proximate coils $L_1$, $L_2$, $L_n$, to control energization of the several motor windings in a selected order, it may be understood that the control mechanism may be arranged to control the energization of the motor windings in response to the change in each bridge circuit from an unbalanced condition to a balanced condition.

With applicants' control mechanism, which is responsive to changes in position of the motor rotor relative to the stator, motor 1 is self-starting. Upon closure of switch 35 at start-up, those bridge circuits having coils L proximate the ferro-magnetic part 18 of member 17 are unbalanced and the motor windings associated therewith are energized as described heretofore to initiate movement of motor rotor 2 and start motor 1.

In the modification shown in FIGURE 2 of the drawings wherein like numerals refer to like parts, the motor control mechanism 40 comprises a pair of ring-shaped parts 41, 42 coaxially disposed in opposed relation one to the other. Part 41 is comprised of a plurality of segmented portions 44 separated by a suitable dielectric means 45. As will be more apparent hereinafter, parts 41, 42 comprise opposite plates or sides of a variable capacitor.

Part 47, fixedly secured to shaft 48, is disposed between members 41, 42. The radius of part 47 is substantially equal the radius of parts 41, 42. Shaft 48 is secured to the rotor 2 of the motor 1.

Parts 42, 47 and portions 44 of part 41 are metal. Portions 44 of part 41 cooperate with part 42 to define a plurality of capacitors. The capacitance of each capacitor is changed upon movement of part 47 therebetween. Part 42 is connected to one terminal of a suitable alternating current signal source, such as oscillator 50. Each portion 44 of part 41 is connected through a resistor 51 to the opposite terminal of oscillator 50. Resistors 51 and parts 41, 42 form one side of an electrical bridge circuit. It is understood that the number of bridge circuit sides defined by resistors 51 and parts 41, 42 are equal to the number of portions 44 into which part 41 is separated which in turn is determined by the number of switching devices to be controlled.

The opposite side of the bridge circuit is comprised of variable resistor 54 and capacitor 55. The junction of resistor 54 with capacitor 55 is connected to the output electrode of the switching devices $S_1$, $S_2$, $S_n$ which may be ground potential. The junctions of resistors 51 with portions 44 of part 41 are each connected to the control electrode of switching devices $S_1$, $S_2$, $S_n$ via lines $T_1$, $T_2$, $T_n$, respectively.

The operation of control mechanism 40 is essentially the same as that described heretofore in conjunction with the control mechanism 10 of FIGURE 1. As part 47, connected for joint rotation with the motor rotor, comes opposite segmented portion 44' of part 41, the capacitance of the capacitor formed by portion 44' of part 41 and part 42 changes and the bridge circuit associated therewith is unbalanced. The unbalanced bridge circuit places a signal voltage via line $T_1$ on the control electrode of switching device $S_1$ to render the switching device $S_1$ operative thereby energizing winding $W_1$. Continued rotation of part 47 in a clockwise direction, as shown by the dotted line arrow, successively changes the capacitance between each adjacent portion 44 and part 42 to render the switching devices $S_2$, $S_n$ operative and energize windings $W_2$, $W_n$, respectively. The discharge of capacitors $C_1$, $C_2$, $C_n$ renders switching devices $S_1$, $S_2$, $S_n$ inoperative in the manner explained heretofore.

It is understood that the number of bridge circuits unbalanced at any one time, and hence the number of windings energized, varies with the arcuate extent of part 47.

While we have described a preferred embodiment of our invention, it is understood that our invention is not limited thereto since it may be otherwise embodied within the scope of the following claims.

We claim:

1. An electric motor system comprising a rotor member and a stator member having a plurality of spaced stator windings therein for producing rotation of said rotor member upon sequential energization of the stator windings; an electric current source; a plurality of switches, each having gate terminal means for controlling the conductivity of its associated switch; one of each of said plurality of switches being connected in circuit with one of a corresponding plurality of said stator windings and with said source of electric current for selectively energizing a corresponding one of said plurality of stator windings; and control circuit means for selectively triggering said switch means at a desired time to sequentially energize said stator windings for producing rotation of said rotor member; said control circuit means including a plurality of spaced stator reactance elements disposed on a stator member; a metal rotor member disposed for movement with said rotor member of said motor into and out of proximity with said reactance elements to affect the magnitude of the reactance thereof; a plurality of electrical signal producing circuits, each including one of said reactance elements, for generating an electrical signal in said circuit upon the occurrence of a predetermined mechanical relation between said metal rotor member and said stator reactance elements; circuit means for triggering one of said switches to a current conducting state upon the occurrence of a signal in a corresponding one of said signal producing circuits, to thereby sequentially energize a corresponding one of said stator windings; and a plurality of capacitors, one of each of said capacitors being connected in circuit with one of said switches and with another of said switches for switching said other switch to a non-conducting condition by discharge of said capacitor therethrough upon switching of said one switch to a conducting condition, thereby automatically sequentially de-energizing a corresponding stator winding upon energization of another stator winding.

2. An electric motor system as defined in claim 1 wherein said control signal producing circuit comprises a bridge circuit having a first impedance element and a second impedance element connected in series with each other across said source of alternating current, said bridge circuit including a plurality of series bridge circuits, each comprising one of said plurality of reactance elements connected in series with one of a corresponding plurality of third impedance elements, each of said series circuits being connected in parallel with each other across said source of alternating current; a plurality of conductors for conducting a signal output from said bridge circuit from the junctions between each of said reactance elements and its corresponding third impedance element to the gate of a corresponding one of said switches for triggering one of said switches to a conducting state upon the occurrence of an unbalance in any one of said series bridge circuits due to the condition of proximity of said metal rotor member with a corresponding one of said reactance elements in said bridge circuit.

3. An electric motor system comprising a motor rotor member and a motor stator member having a plurality of spaced stator windings thereon for producing rotation of said motor rotor upon sequential energization of the motor stator windings; a source of electric current for energization of said motor stator windings; a plurality of solid state switches, said solid state switches each including a gate terminal for triggering its associated switch to a conducting state; a plurality of a unidirectional current conducting devices; a plurality of series motor circuits each including a corresponding one of said unidirectional current conducting devices, one of said motor stator windings, and one of said solid state switches connected in series with each other across said source of electric current for selectively energizing said motor stator windings with unidirectional current from said source of electric current upon triggering of one of said solid state switches to a conducting state; a control arrangement for sequentially triggering said solid state switches to a conducting state for a desired length of time in a predetermined desired sequence, said control arrangement including a plurality of stator reactance elements spaced on a stator member and a metal rotor member disposed for movement with said motor rotor member into and out of proximity with said stator reactance elements to sequentially affect the magnitude of the reactance of said stator reactance elements upon rotation of said rotor member; a source of alternating current; a bridge circuit including a first leg comprising a first impedance element, a second leg comprising a second impedance element, a plurality of third legs each comprising a third impedance element, and a plurality of fourth legs each comprising one of said stator reactance elements, said first and second impedance elements being connected in a series circuit across said source of alternating current, one of each of said plurality of third impedance elements being connected in a series bridge circuit with one of each of said plurality of reactance elements to form a plurality of series bridge reactance circuits, each of the series bridge reactance circuits being connected in parallel with said source of alternating current; said bridge circuit having a first output terminal disposed between said first impedance element and said second impedance element connected to a common terminal of said plurality of solid state switches, said bridge circuit having a plurality of second output terminals, one of each of said second output terminals being disposed between said plurality of third impedance elements and said plurality of stator reactances, one of each of said second output terminals being connected to a corresponding gate terminal of one of each of said solid state switches for triggering the corresponding switch to a conducting state for sequentially energizing said stator windings upon the occurrence of a predetermined change in reactance of the corresponding reactance elements due to the proximity of said metal rotor member thereto; and means connected in circuit with one of said solid state switches and with another of said solid state switches, for switching said other switch to a nonconducting condition upon switching of said one solid state switch to a conducting condition, thereby automatically sequentially deenergizing the stator winding in the series motor circuit having said other solid state switch therein.

4. An electric motor system as defined in claim 3 wherein said stator reactance elements comprise inductors.

5. An electric motor system as defined in claim 3 wherein said stator reactance elements comprise capacitors.

6. An electric motor system as defined in claim 3 including a plurality of second unidirectional current conducting devices, one of each of said unidirectional current conducting devices being connected in series between one of each of the second output terminals of said bridge circuit and its associated gate terminal of the solid state switch to which said second output terminal is connected.

References Cited

UNITED STATES PATENTS

| 3,153,185 | 10/1964 | Hummel | 318—138 X |
| 3,214,663 | 10/1965 | Krevtz | 318—138 |
| 3,239,739 | 3/1966 | Scholl | 318—138 |
| 3,242,405 | 3/1966 | Ikegami | 318—138 |
| 3,242,406 | 3/1966 | Tanake | 318—138 |

ORIS L. RADER, *Primary Examiner.*

G. SIMMONS, *Assistant Examiner.*